United States Patent

Lee et al.

[11] Patent Number: 6,138,025
[45] Date of Patent: Oct. 24, 2000

[54] METHOD FOR DISTRIBUTING PAGING LOAD IN A CELLULAR WIRELESS COMMUNICATION SYSTEM AND SYSTEM WITHIN WHICH SUCH METHOD IS IMPLEMENTED

[75] Inventors: Hee C. Lee; Wei Yuan, both of Plano; Sairam Subramanian, Dallas; Sheng-Chou Lin, Plano, all of Tex.

[73] Assignee: Nortel Networks Limited, Montreal, Canada

[21] Appl. No.: 09/032,419

[22] Filed: Feb. 26, 1998

[51] Int. Cl.⁷ .................................................. H04Q 7/20
[52] U.S. Cl. ........................ 455/453; 455/435; 455/456
[58] Field of Search ................................... 455/453, 432, 455/446, 456, 458, 435

[56] References Cited

U.S. PATENT DOCUMENTS

| | | | |
|---|---|---|---|
| 4,670,899 | 6/1987 | Brody et al. | 379/60 |
| 5,241,685 | 8/1993 | Bodin et al. | 455/33.2 |
| 5,361,396 | 11/1994 | Onoe et al. | 455/433 |
| 5,369,681 | 11/1994 | Boudreau et al. | 455/456 |
| 5,548,816 | 8/1996 | De Vaney | 455/456 |
| 5,590,398 | 12/1996 | Matthews | 455/456 |
| 5,754,959 | 5/1998 | Ueno et al. | 455/453 |
| 5,862,483 | 1/1999 | Fletcher et al. | 455/435 |
| 5,907,810 | 5/1999 | Subramanian et al. | 455/458 |
| 5,912,884 | 6/1999 | Park et al. | 370/331 |

FOREIGN PATENT DOCUMENTS

WO 97/29610   8/1997   WIPO ............... H04Q 7/38

*Primary Examiner*—Edward F. Urban
*Assistant Examiner*—Tilahun Gesesse
*Attorney, Agent, or Firm*—Bruce Garlick; John Crane; James Harrison

[57] ABSTRACT

A method for distributing paging load in a multicell wireless communication system establishes a plurality of location areas, with each location area including at least one cell. A load limit is based upon the greatest number of pages that may be transmitted in a particular cell over a given time period for cells of the multicell wireless communication system is determined. A paging load for the cellular wireless communication system is determined based upon historical loading and/or simulations and projections. A plurality of location areas are determined so that the paging load is distributed among the plurality of location areas such that a partial paging load respective to each cell of the multicell wireless communication system is less than a respective load limit. Boundaries of the location areas are then chosen to substantially minimize registration load within the multicell wireless communication system. In reducing registration loading, the location areas may be created so that some of the cells of the multicell wireless communication system reside in a plurality of location areas. A graph partitioning algorithm, such as a modified KL algorithm may be used to create the location areas and set the boundaries. In such operation, weights are determined for each node (cell) and edge in the graph, such weights based upon respective paging loads, non-paging loads and expected mobility between cells for the respective cell. Once these weights have been assigned, a modified KL graph partition is performed to find the location area boundaries which reduce registration loading. A multicell wireless communication system constructed according to the present invention includes a plurality of location areas having boundaries selected to reduce registration loading.

24 Claims, 8 Drawing Sheets

FIG. 6

METHOD FOR DISTRIBUTING PAGING LOAD IN A CELLULAR WIRELESS COMMUNICATION SYSTEM AND SYSTEM WITHIN WHICH SUCH METHOD IS IMPLEMENTED

PRIORITY CLAIM TO RELATED APPLICATION

The present application claims priority pursuant to 35 U.S.C. Sec. 120 to U.S. Pat. No. 5,907,810, issued May 25, 1999, filed on Nov. 6, 1996 as U.S. Regular application Ser. No. 08/743,689.

BACKGROUND

1. Technical Field

The present invention relates generally to cellular wireless communication systems; and more particularly to a method for distributing paging within such a cellular wireless communication system to reduce paging load by creating a plurality of location areas within the cellular wireless communication system such that registration requirements between the location areas are minimized.

2. Related Art

The cellular communications industry has experienced very rapid growth in both the areas serviced and the number of subscribers. In many metropolitan areas in North America, mobile switching centers receive service requests numbering in excess of 100,000 call attempts per hour from mobile units operating within respective service areas. The service area of each such mobile switching center typically includes a network of 100 or more cells. In its operation, the mobile switching center keeps track of all mobile units currently operating in its service area via a database commonly referred to as a visitor location register. The visitor location register stores information regarding the services available to each subscriber, his home mobile switching center and the current status (e.g., active or inactive) of the mobile unit.

The mobile switching center, however, does not usually have accurate information regarding the precise geographical location of each of the mobile units within the service area. Consequently, when a call is initiated to a mobile unit believed to be within the service area, a page must be broadcast over the forward control channels, which are also known as the paging and access channels of all cells in the service area. When the mobile unit responds to the page message, the particular cell containing the mobile unit is then identified from the reverse control channel used for the mobile response and the call is then set up. In the event there is no response to the page, the system assumes that the mobile unit is currently inactive and the call is treated accordingly.

Since each typical mobile switching center in an urban area serves a system with over 100 cells, in order to broadcast a page message over the forward control channels of all the cells in such a typical system, the paging message must be replicated a corresponding number of times and sent to each cell. As only one cell in the system can receive a response from the mobile unit, this means that a large number of these paging messages are an additional cost of locating the mobile unit but result in no reply whatsoever. System wide, each cell must send paging messages for every call initiated to every mobile unit operating within, or believed to be operating within, the service area. These paging messages put a huge load on the forward control channels of all cells in the service area consume resources of the mobile switching center that would otherwise be available for performing other tasks. Hence, the overall system performance is degraded by the overhead caused by the generation of unneeded paging messages.

Various approaches have been suggested for overcoming this problem. In one such approach, the service area of the cellular system is partitioned into location areas which are smaller than the service area. Every time a mobile unit enters a location area, it registers within the location update, such registration indicating that the mobile unit is operating within the location area. When a call is initiated to the mobile unit, therefore, the paging message is sent only from the cells making up the location area. Resultantly, the paging load across the system is dramatically reduced since each cell sends paging messages only for calls initiated to the mobile units registered within its location area. However, this approach does increase the number of registration activities as registration occurs each time an active mobile unit moves from one location area to another location. The registration activity in such a system is significantly greater than is required in systems where registration occurs only when a mobile unit is moved from one service area to another service area.

Setting location areas in a network, thus, is a trade off between paging and registration. First of all, location area size is an important factor in determining the location areas. If the location areas are too large, then the paging load on cells in the location areas will exceed the forward control channel link capacity. On the other hand, if the location areas are too small, the number of registrations introduced by setting the smaller location areas will consume the forward control channel link capacity. In both cases, active mobiles will be unable to receive calls and/or short message services due to the lack of forward link control channel capacity.

Thus, location area formation is far more complex than simply determining the size of the location areas. Due to the non-uniformity of traffic and mobility in wireless networks, the location of borders between location areas is a key factor in determining location area boundaries. Improper location area boundary settings may cause the network to perform more poorly than if no location areas were used at all.

Thus, there is a need in the art for an improved technique for determining location areas that will not only cause paging load to conform to limited control channel resources, but to cause registration operations to be minimized so that the capacity of a wireless communication system within which the location areas are implemented will be maximized.

SUMMARY OF THE INVENTION

A method for distributing paging load in a multicell wireless communication system according to the present invention overcomes the limitations of the prior techniques, among other techniques, by establishing a plurality of location areas within a service area of the multicell wireless communication system. In a first operation of the method, a load limit for cells of the multicell wireless communication system is determined. The load limit is based upon the greatest number of paging and registration messages that may be transmitted over the forward control channel of any particular cell of the system within a given time frame. Then, a paging load for the cellular wireless communication system is determined. The paging load is typically determined based upon historical loading information within the wireless communication system and includes mobile unit paging load, registration load and other loading related to paging.

Once the paging load and load limit are determined, a plurality of location areas within the multicell wireless communication system are determined so that the paging load is distributed among the plurality of location areas. In determining the location areas, a partial paging load respective to each cell of the multicell wireless communication system must be less than a respective load limit. Finally, with the location areas determined, boundaries of the location areas are chosen to substantially minimize registration load within the multicell wireless communication system. Since the number of location areas is the minimum required. The number of location areas initially selected is a minimum. Thus, an overall optimal solution is reached when registration loading is minimized. Resultantly, the capacity of the wireless communication system is increased by a substantially maximum level due to introduction and operation of the location areas according to the present invention.

Typically, the paging load for the cellular wireless communication system is determined based upon historical operations of the cellular wireless communication system. However, the paging load could be estimated and/or projected. The load limit for a particular cell is determined based upon control channel resources available to the cell for paging functions. For example, when a digital control channel is used, a certain bandwidth is allocated for paging. According to the present invention, the paging loading in each location area is less than the allocated paging bandwidth and the registration loading is minimized and less than an allocated registration bandwidth. In minimizing registration loading, the location areas may be created so that some of the cells of the multicell wireless communication system reside in a plurality of location areas.

In one embodiment of the method of the present invention, to determine the location area boundaries, the multicell wireless communication system is first represented as a graph with each cell represented as a node in the graph. Weights are then determined for each node and edge in the graph that is created. Each node (cell) in the graph is assigned a weight based upon respective paging load for the respective cell. Further, each edge from a node to itself in the graph is assigned based upon non-paging load for the respective cell. Finally, each edge between bordering nodes in the graph is assigned a weight based upon registration load between the bordering nodes. Once these weights have been assigned, a modified KL graph partition may be performed to find the boundaries which reduce registration loading.

In the graph partition operation, in finding the location area boundaries, cells may be moved between location areas in an attempt to reduce registration load. Further, cells may also be swapped between location areas in an attempt to reduce registration load. When performing cell swapping, it may be determined that placing cells in multiple location areas also reduces paging load.

In an alternate operation of the method of the present invention, the number of location areas required is first estimated. Then, the location area boundaries are determined to substantially minimize registration load within the multicell wireless communication system. When the boundaries have been determined, the maximum paging load within the multicell wireless communication system is then calculated. If the maximum paging load exceeds the load limit, the number of location areas required is then re-estimated. Once such re-estimation has been completed, the location area boundaries are re-determined to substantially minimize registration load.

A multicell wireless communication system constructed according to the present invention is configured to have reduced paging load. The wireless communication system includes a wireless communication system infrastructure that provides wireless service within a plurality of cells. The plurality of cells together form a service area that services a paging load. Each of the plurality of cells has a load limit that is typically based upon available bandwidth within a respective control channel. A plurality of location areas are formed such that each of the plurality of location areas includes at least one cell of the plurality of cells. Further, each location area supports a portion of the paging load so that each portion of the paging is less than the load limit. Boundaries between the location areas separate the location areas to substantially minimize registration load within the multicell wireless communication system.

Moreover, other aspects of the present invention will become apparent with further reference to the drawings and specification which follow.

BRIEF DESCRIPTION OF THE DRAWINGS

FIG. 6 is a schematic diagram illustrating a cellular wireless communication system with a plurality of cells forming a service area and within which location areas have been formed according to the method described in FIG. 5.

DETAILED DESCRIPTION OF THE DRAWINGS

Figure 1:
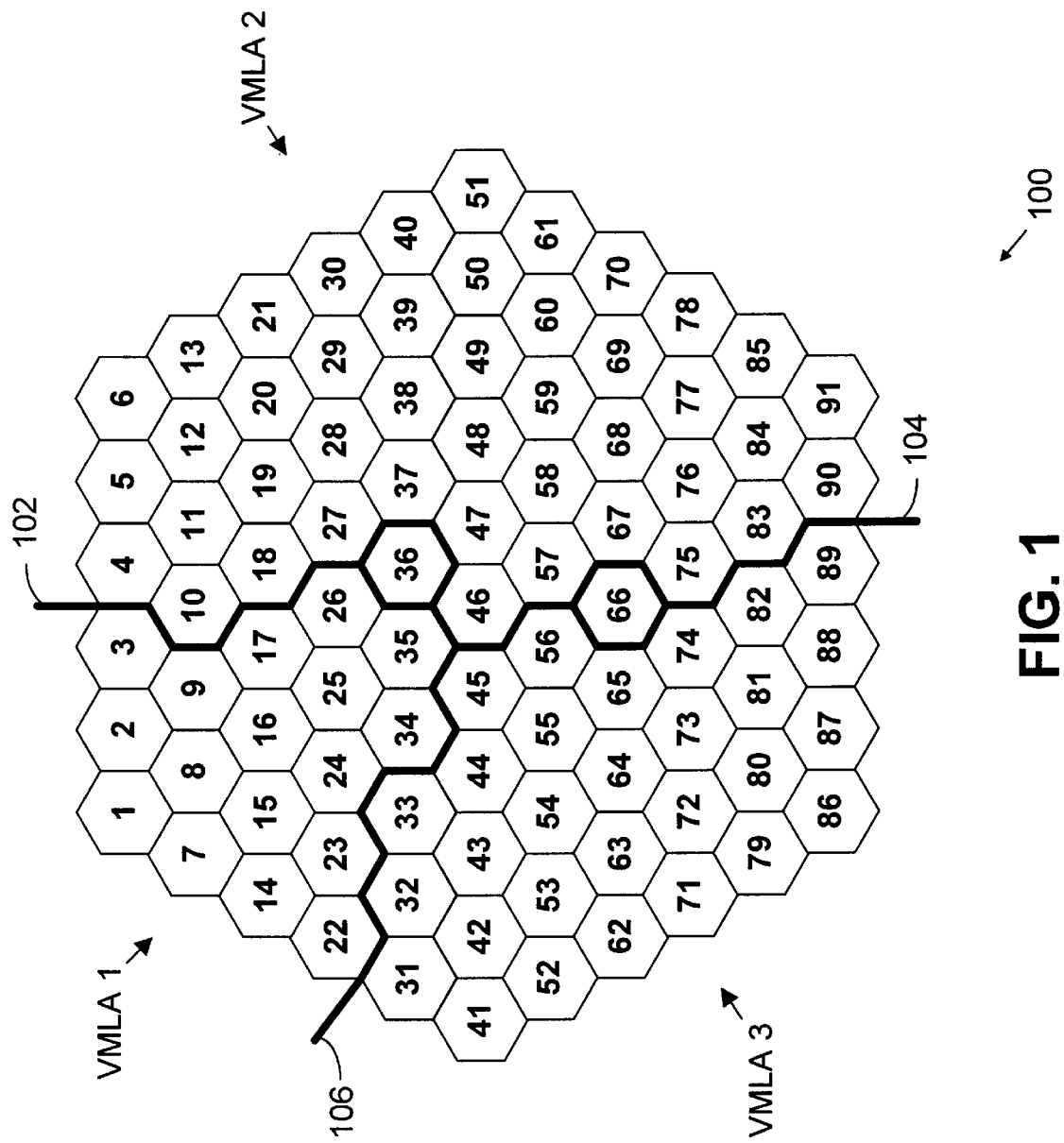
FIG. 1 is a schematic diagram illustrating a cellular wireless communication system with a plurality of cells forming a service area and within which location areas have been formed according to the present invention.

FIG. 1 illustrates a wireless communication system service area 100 which operates according to the present invention. The service area 100 is divided into a plurality of cells, numbered 1 through 91. At least one base station provides wireless coverage within each of the cells. The base stations are intercoupled with other hardware components to form an infrastructure (the "network") that supports wireless communications with a plurality of mobile and fixed wireless units operating within the service area 100. The construction and operation of such a wireless communication system is generally known and will be discussed only as required to disclose the principles of the present invention.

Wireless communications within the service area 100 proceed according to the IS-136 Time Division Multiple Access (TDMA) communication protocol in a described embodiment. However, in other embodiments, that also operate according to the principles of the present invention, other operating protocols are used. Such other operating protocols may include, for example, the Global Standard for Mobility (GSM) and the Code Division Multiple Access (CDMA) standard, among other standards and protocols.

Each sector (called a "cell" in the IS-136 TDMA standards) of the base stations broadcasts a control channel, upon which is coupled control information and short user data messages intended for mobile units operating within respective cells. In the described embodiment, each of the base stations broadcasts a Digital control channel (DCCH) within its respective cells or sectors, the DCCH operating in a digital fashion as compared to its analog counterpart. Throughout this application, the terms "cell" and "sector" shall be used interchangeably with no limitations created or implied due to the particular usage.

Figure 2A:
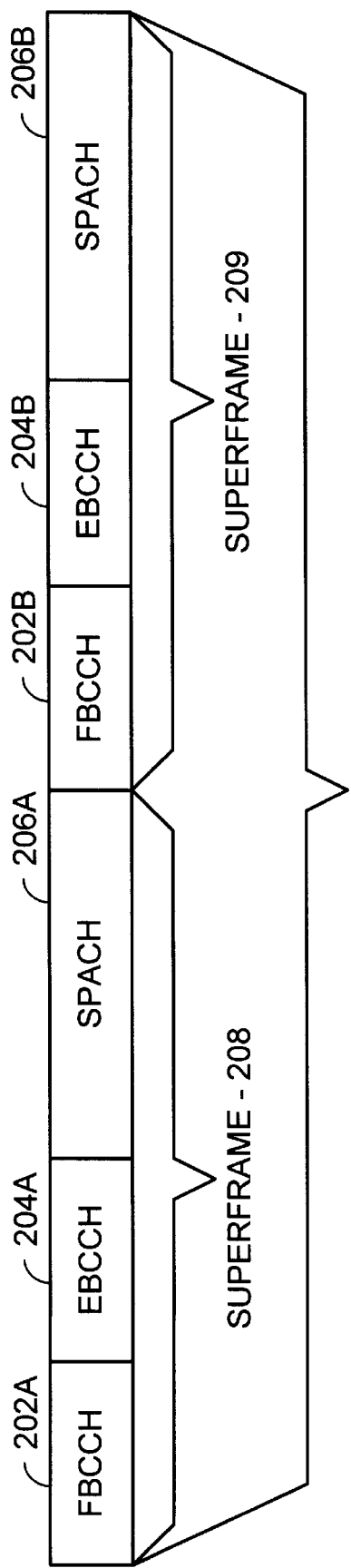
FIGS. 2A and 2B are block diagrams illustrating the structure of control channel signals within one embodiment of a wireless communication system.
Figure 2B:
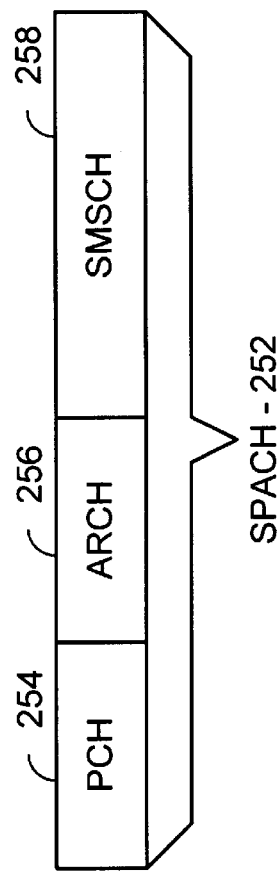

Each DCCH has a bandwidth limit which will be more fully described with respect to FIGS. 2A and 2B. One operation which consumes a portion of this bandwidth is the paging function. The paging function is employed when a base station notifies a mobile unit, which is believed to be operating within range of the base station, that the mobile unit has a call to be received. Because many mobile units are supported within the service area 100, the paging load of the service area may be so large to exceed the DCCH bandwidth allocated for the paging function. Thus, the service area is divided into Virtual Mobile Location Areas (VMLAs), each of which encompasses at least one cell, but typically, a plurality of cells.

Each cell resides within at least one VMLA. As is shown, the service area 100 has been divided into three VMLAs, VMLA 1, VMLA 2 and VMLA 3. Boundary 102 represents generally the boundary between VMLA 1 and VMLA 2, boundary 104 represents generally the boundary between VMLA 2 and VMLA 3 and boundary 106 represents the boundary between VMLA 1 and VMLA 3. Further, as is shown, some cells reside within two VMLAs. For example, cell 36 resides within both VMLA 1 and VMLA 2 while cell 66 resides within both VMLA 2 and VMLA 3.

Paging load is divided among the VMLAs, with each VMLA issuing pages only for those mobile units believed to be operating within the VMLA. For example, each cell within VMLA 3 will issue pages for mobiles believed to be operating within VMLA 3. However, to determine which mobile units operate within particular VMLAs, the mobile units must register with the VMLA upon entry, may un-register upon leaving the VMLA and may periodically perform other functions relating to VMLA registration. Unfortunately, while the creation of VMLAs reduces paging load, it creates registration load which includes registration confirmation messages sent from the base stations to mobile units upon the DCCH. Thus, a tradeoff occurs in creating VMLAs since increasing the number of VMLAs reduces paging load within each VMLA but increases registration load within the VMLAs.

According to the present invention, the boundaries between VMLAs are selected so that the paging load is substantially equalized among the VMLAs, the maximum paging load on any cell within any VMLA is less than a determined threshold and the registration load relating to the VMLAs is minimized. The VMLA boundaries are determined first by determining the loading characteristics of the cellular wireless communication system and then, based upon the loading characteristics, iteratively moving the VMLA boundaries until the optimum VMLA boundaries are chosen. According to the present invention, one or more cells within a service area may reside within multiple VMLA boundaries. With reference to FIG. 1, the boundaries of VMLA 1, VMLA 2 and VMLA 3 have been chosen to equalize paging load within the VMLAs and to minimize registrations within the VMLAs. Further, boundary cells 36 and 66 have each been placed in multiple VMLAs to further enhance operation by reducing registration of mobile units moving between adjacent VMLAs.

FIGS. 2A and 2B illustrate the structure of the forward link DCCH (FDCCH) that is transmitted from each of the base stations and received by mobile units operating within range of the base stations. The FDCCH is a time multiplexed signal that is divided into slots which are time multiplexed and referred to as logical subchannels. The logical subchannels are packed into hyperframes 210 and sent out at a speed of a hyperframe per 1.28 seconds, according to the IS-136 standards. Thus, the number of hyperframes that can be sent out in a hour is equal to 3600 seconds/hour * 1.28 hyperframes/second=2812 hyperframes/hour.

Each hyperframe 210 includes two superframes 208 and 209, each of which carries the same data for redundancy. The first superframe 208 has 32 time slots which are shared by a Fast Broadcast Channel (FBCCH) 202A, an Extended Broadcast Channel (EBCCH) 204A and an SMS-Paging-Access Channel (SPACH) 206A. Likewise, the second superframe 209 also has 32 time slots which are shared by identical FBCCH 202B, EBCCH 204B and SPACH 206B. The FBCCH 202A is used for sending essential system data required for service and the EBCCH 204A is used for sending non-critical data for extended services. These two channels take the same number of time slots across the network. Thus, the number of time slots used for the FBCCH 202A and 202B and the EBCCH 204A and 204B can be pre-determined, independent of the variable loading factors. Thus, the number of SPACH slots 206A and 206B available in a superframe is equal to:

$$\text{SPACH}=32-\text{FBCCH}-\text{EBCCH} \qquad (Eq. 1)$$

Since the two superframes 208 and 209 in the hyperframe 210 carry the same data, the total number of actual SPACH time slots 206A available in a hour is defined as:

$$\text{Limit}=2812\times\text{SPACH}\times\text{englmt}\times\text{hdrm} \qquad (Eq. 2)$$

where englmt is the engineering limit and hdrm is the growth rate (head room). Englmt represents the margin associated with operating the system while hdrm represents the margin associated with short term positive fluctuations in system loading. Englmt is typically selected to be within the range of 60% to 80% while hdrm is typically selected to be in the range of 5% to 30%.

As illustrated in FIG. 2B, a SPACH slot 252 is shared by a Paging Channel (PCH) 254, an Access Response Channel (ARCH) 256 and a Short Message Service Channel (SMSCH) 258. The PCH 254 is for paging mobiles (regular paging, Message Waiting Indication (MWI) and SMS paging). The ARCH 256 is used when the base station responds to a previous mobile station access message, the ARCH 256 including acknowledgement and voice channel assignment, etc. The SMSCH 258 is used for sending teleservice messages (SMS payload) to mobiles. Therefore, the number of time slots consumed on the SPACH 252 at a cell during a busy hour is equal to the sum of PCH 254, ARCH 256 and SMSCH 258.

Figure 3:
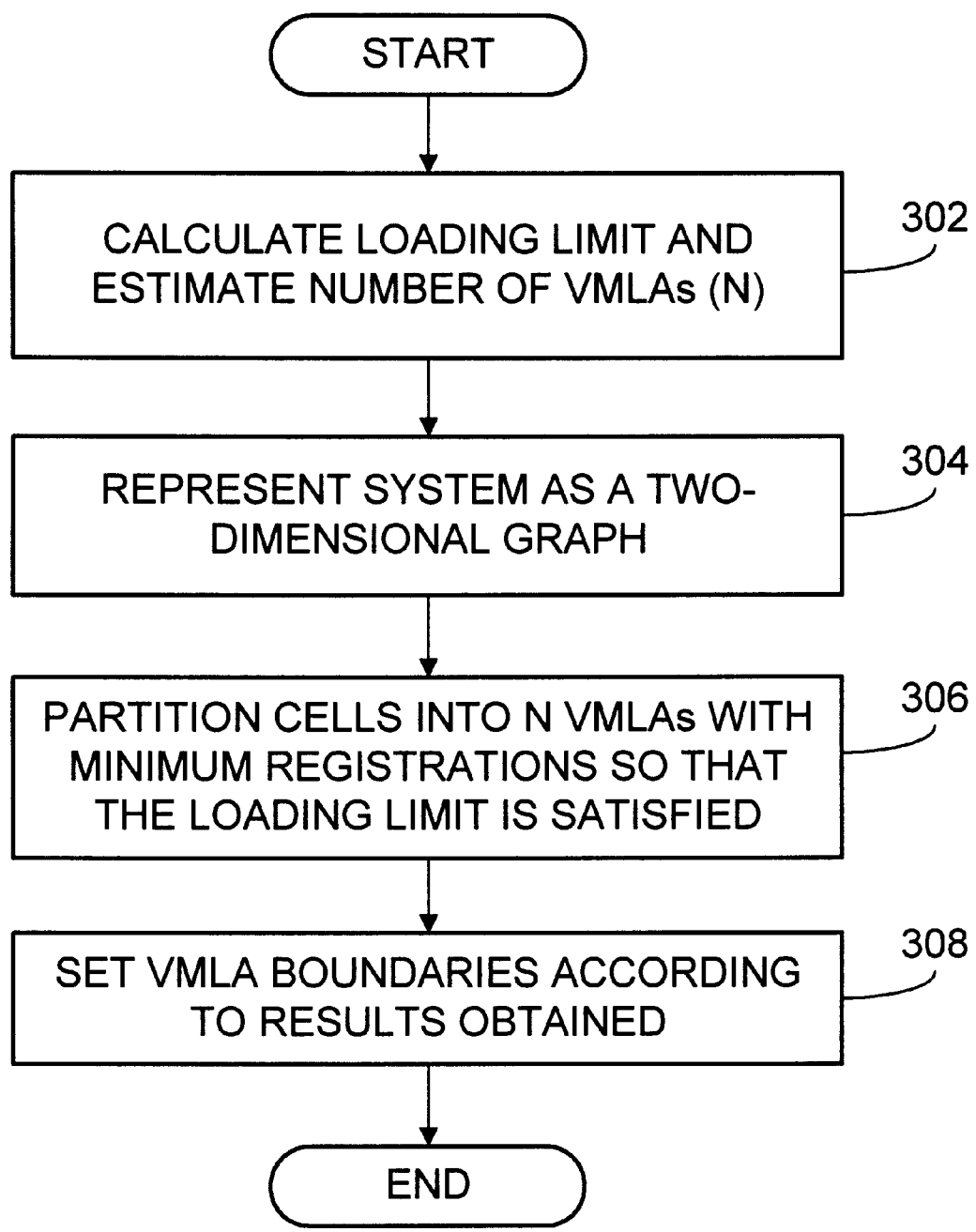
FIG. 3 is a logic diagram illustrating generally a method for forming location areas within a cellular wireless communication system according to the present invention.

FIG. 3 illustrates a method 300 of determining VMLA boundaries within a wireless communication system service area according to the present invention. The method 300 commences at step 302 where the loading limit (Limit) is determined for the service area and an estimate is made as to the number of VMLAs that will be required for the service area given estimated loading for the service area. Operation then proceeds to step 304 where the system is represented as a two-dimensional graph. Once the two-dimensional graph has been created, the cells of the service area are divided into N separate VMLAs such that the number of registrations of mobiles passing from VMLA to VMLA is minimized and so that the loading constraint limit is satisfied. Once such a partition has been established, operation proceeds to step 308 wherein the VMLA boundaries are set according to the results obtained.

Consistent with step 302, in determining the estimated number of VMLAs required, a determination of SPACH loading (paging load) must first be made. In doing so, the time slot consumption during a busy hour must be calculated. Historical information and simulations are used to calculate the loading during a busy hour within the service area 100. The busy hour loading determines a worst case estimate which may be used in setting the VMLAs. During lesser loaded time periods, the paging and registration loading will also be less. As was previously discussed, the SPACH includes the PCH, the ARCH and the SMSCH. Loading must be determined for each to determine the SPACH loading.

The PCH is used for regular paging, MWI and SMS paging. When there is a paging request (e.g., to locate a mobile for a mobile termination call via a regular page), all cells in the VMLA of which the mobile has registered have to page this mobile. Thus, a base station has to transmit pages intended for all mobile units residing within the VMLA(s) of which it is a member. The PCH slots consumed at a cell c during a busy hour is therefore estimated by the equation:

$$PCH = \sum_{c \in VMLA} [Mobile\_Termination\ (c)/\alpha + MWI(c) + SMS\_Paging\ (c)] \times (1 + rpgr) \quad \text{(Eq. 3)}$$

where Mobile_Termination(c) is the number of mobile terminations in cell c, MWI(c) is the MWI load for cell c and SMS_Paging is the SMS paging load for cell c during the relevant time period and rpgr is the repage rate and $\alpha$ ($1<\alpha<3$), a parameter to address the fact that up to 3 regular paging messages can be packed into a PCH slot at a time. Each of these values is determined based upon historical loading information for each of the cells within the system, from other operating models and from standard tables for the given system.

Of the three channels comprising SPACH, determining the time slots consumed by ARCH is the most complicated calculation. Whenever a mobile initiates a registration, the signal goes through the reverse control channel to the mobile switching system, which then sends acknowledgment to the mobile through ARCH. There are 6 types of registrations: PSID/RSID registrations, power on registrations, power down registrations (no acknowledgment), periodic registrations, de-registrations and locate area registrations. The acknowledgement message takes 1 time slot if the registration is rejected. The number of time slots that a registration acceptance acknowledgement takes depends upon the number of RNUMs on the RNUM list of the registered VMLA. RNUMs are numbers transmitted by base stations within the FDCCH identifying the sector or cell of the base station by an RNUM. Each cell or sector transmits a single RNUM. Membership within VMLAs is determined by RNUMs. For example, a particular VMLA, e.g. VLMA 2, has been set to include those cells or sectors having only the RNUM 5. Thus, upon receipt of the RNUM 5 by a mobile unit, the mobile unit determines that the transmitting cell or sector is in VLMA 2. However, should the mobile unit receive a control channel from another cell or sector with an RNUM of 9, it determines that it is no longer in VLMA 2 and registers in the new VLMA. In non-optimal cases, each VLMA includes multiple RNUMs, such multiple RNUMs contained on an "RNUM list." Further, in overlap cases, multiple RNUMs will be included in each VLMA, even in optimal cases.

The formula to calculate the registration acceptance slots is $$regAcptSlots=[(60+10\times RNUM)/95] \quad \text{(Eq. 4)}$$

where RNUM denotes the number of RNUMs on the RNUM list of the registered VMLA. In non-overlap cases, each VMLA needs one RNUM on its RNUM list and all cells or sectors in the VMLA transmit the same RNUM. However, in overlapping cases, a VMLA may include as many as 20 RNUMs on its RNUM list, indicating that it is in multiple VMLAs. With multiple RNUMs on the RNUM list, as many as three time slots may be required for a single registration acceptance message. Thus, in an overlap case, the cost for registrations is much greater than non-overlap case even though overlapping may reduce the number of VMLA registrations.

For each call, the system must inform the mobile unit of which voice channel it has been assigned through the ARCH. For each mobile origination call, the system has to send an acknowledgement message to the mobile through ARCH. Therefore, the ARCH slots consumed overall is determined by the equation:

$$ARCH=Registration\ Acceptance \times regAcptSlots+Registration\ Rejection+BHCA+incoming\ Hdof \quad \text{(Eq. 5)}$$

where Registration Acceptance, Registration Rejection and BHCA are determined based upon the operating model of a service area under consideration and from standard operating tables. Other parameters herein may be determined in the same or similar manner. In the model, Registration Acceptance represents the historical rate at which registrations are accepted, Registration Rejection indicates the historical rate at which registrations have been rejected and "BHCA+ incoming Hdof" indicates the number of voice channel assignments. Each of these parameters of course may be adjusted to account for particular system conditions that may affect operation according to the method of the present invention.

The SMSCH is used for sending teleservice messages (SMS payload) to mobiles. The number of time slots that a SMS message takes depends upon the SMS message length (in bytes).

On the average, the SMS slots consumed are defined by:

$$Average\ SMS\ slots=[(25+8\times Average\_SMS\_length\ in\ byte)/79]+1 \quad \text{(Eq. 6)}$$

And the number of SMSCH slots consumed is defined by:

$$SMSCH=number\ of\ SMS\ messages \times average\ SMS\ slots \quad \text{(Eq. 7)}$$

Where the number of SMS messages, the average SMS slots and the Average_SMS_length in byte are determined based upon historical information, operating models and standard tables.

Using the above formulas, the load (in time slots) on the SPACH of a cell during a busy hour for any given VMLA setting is determinable. However, a valid VMLA setting must ensure that the load (in time slot) on every cell is less than Limit, the total number of actual SPACH time slots available in a hour. Thus, to complete the calculations required in step 302, the Limit is determined by the equation:

$$\text{Limit} = 2812 \times (32 - \text{FBCCH} - \text{EBCCH}) \times \text{englmt} \times \text{hdrm} \quad \text{(Eq. 8)}$$

based on given parameters FBCCH, EBCCH, an engineering limit (englmt) and a growth rate (hdrm). Englmt and hdrm are similar to those values chosen in Eq. 2 and may have the same values.

Based upon the Limit determined, the estimated number of VMLAs needed is determined by:

$$N = \frac{\text{Page\_requests}}{\text{Limit}} \quad \text{(Eq. 9)}$$

where Page_requests is the total number of paging requests during a busiest hour and is determined from historical information for the cellular wireless communication system. Thus, N is the least number of VMLAs that will be needed. However, in determining an optimal VMLA partition, additional VMLAs may be required.

Figure 4:
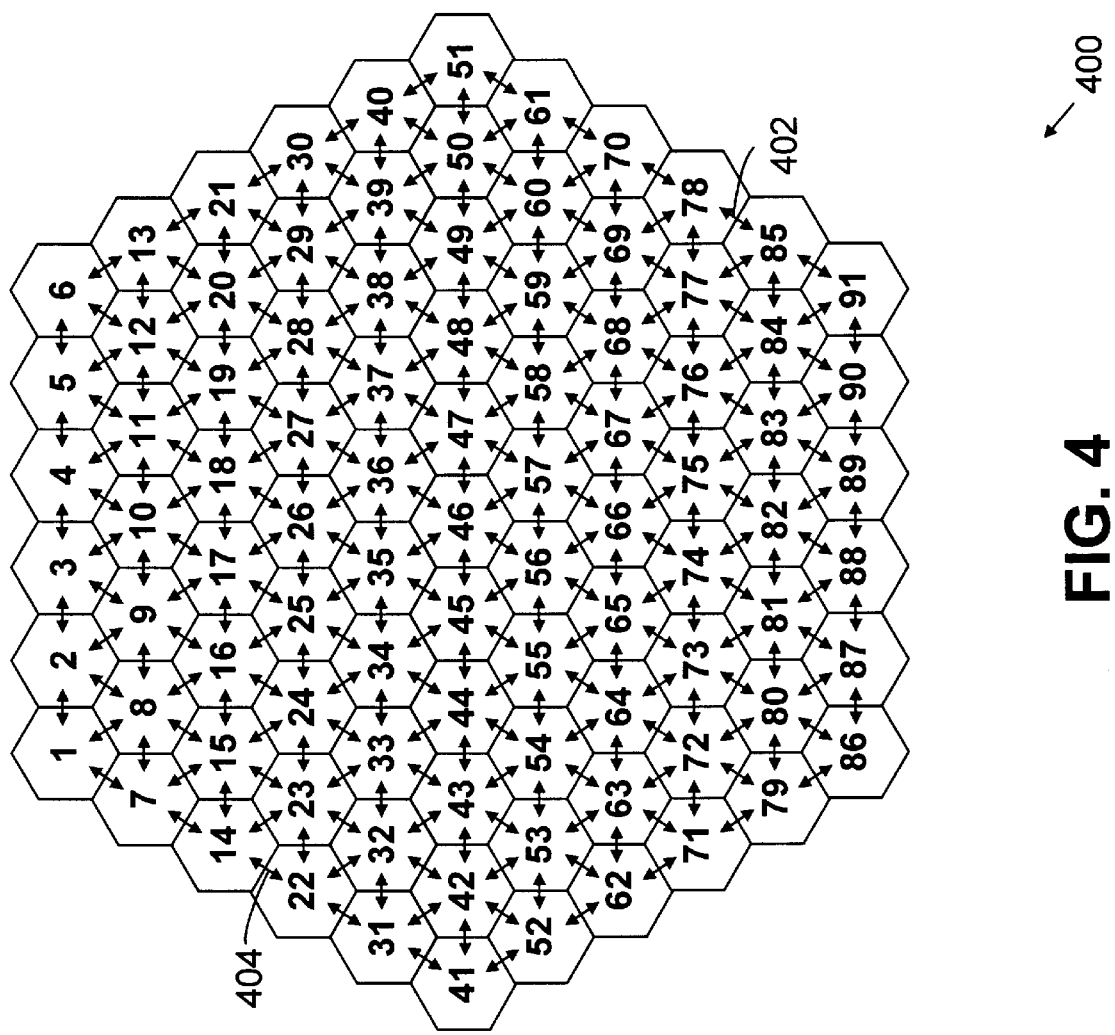
FIG. 4 is a schematic diagram illustrating a graph that has been created according to the method of the present invention in which loading on cells and between cells is determined.

Once the operations associated with step 302 of FIG. 3 have been completed, a two dimensional graph of the service area 100 is created at step 304. FIG. 4 illustrates a graph 400 for the service area. A node in the graph 400 represents a cell in the system so that each cell 1 through 91 is a unique node within the graph. The graph 400 also includes a plurality of edges for each of the nodes. The graph 400 includes two types of edges, edges from a node to itself and edges from nodes to their adjacent nodes. For example edge 402 is between cell 78 and cell 85 while edge 404 is between cell 14 and cell 22. Weights are assigned to the nodes and edges in the graph as follows:

Each node (cell c) is assigned a weight corresponding to the equation:

$$\text{node\_wt}(c) = [\text{Mobile\_Termination}(c)/\alpha + \text{MWI}(c) + \text{SMS\_Paging}(c)] \times (1 + \text{rpgr}) \quad \text{(Eq. 10)}$$

which represents a fraction of the PCH load on all cells in a respective VMLA due to traffic from cell c.

Each edge from a node (cell c) to itself is assigned a weight corresponding to the equation:

$$\text{edge\_wt}(c,c) = \text{SMSCH}(c) + \text{ARCH1}(c) \quad \text{(Eq. 11)}$$

where SMSCH(c) represents the time slots consumed due to SMSCH payload on cell c and ARCH1(c) represents all ARCH load on cell c except for ARCH load due to VMLA registrations.

An edge from a node (cell c) to its adjacent node (cell b) is assigned a weight according to the equation:

$$\text{edge\_wt}(b,c) = \text{ARCH2}(c) = \text{regHofRatio} \times \text{handoff}(b,c) \times \text{regAcptSlots} \quad \text{(Eq. 12)}$$

where handoff(b,c) denotes the number of handoffs from cell c to b during the relevant period and regHofRatio is a ratio between the number of registrations and handoffs in the service area 100, both of which are determined by simulation results and/or historical data. This edge weight computes possible VMLA registrations from cell c to b if cells c and b reside in different VMLAs.

Since the load of SPACH on a cell consists of PCH, SMSCH and ARCH, the SPACH load on a cell is:

$$\begin{aligned} SPACH(c) &= PCH(c) + SMSCH(c) + ARCH(c) \\ &= \sum_{a \in VMLA} \text{node\_wt}(a) + \text{edge\_wt}(c,c) + \\ &\quad \sum_{b \notin VMLA} \text{edge\_wt}(b,c) \end{aligned} \quad \text{(Eq. 13)}$$

The load on a VMLA is defined as the SPACH load on the heaviest load cell within the VMLA according to the equation:

$$Load(VMLA) = \sum_{a \in VMLA} \text{node\_wt}(a) + \quad \text{(Eq. 14)}$$
$$\max_{c \in VMLA} \left[ \text{edge\_wt}(c,c) + \sum_{b \notin VMLA} \text{edge\_wt}(b,c) \right]$$

The total number of VMLA registrations for the VMLA is defined by the equation:

$$total\_reg = \sum_{VMLA \subset Switc} \sum_{c \in VMLA} \sum_{b \notin VMLA} regHofRatio \times handoff(b,c) \quad \text{(Eq. 15)}$$

In overlapping VMLA cases, the loads on cells and VMLAs are calculated differently because a cell may belong to more than one VMLA. For a given cell (cell c), the base station pages mobiles registering in all VMLAs covering cell c. Thus the PCH load for cell c which resides in multiple VMLAs is defined by the equation:

$$PCH(c) = \sum_{V \supset c} \sum_{a \in V} \frac{\text{node\_wt}(a)}{numV(a)} \quad \text{(Eq. 16)}$$

where $V \supset c$ includes all VMLA V covering cell c and numV(a) is the number of VMLAs covering cell a. In this case, cell c need only page the fraction of the mobiles in cell a which are registered in VMLA V. That is why in the formula node weight is divided by numV(a). In overlapping case, a mobile registers at a VMLA covering cell c only when it moves from cell b to cell c and it previously registered at a VMLA covering cell b but not cell c. In other words, only a fraction of mobiles moving from cell b to cell c register upon the move. Thus, the VMLA registration load on cell c is defined by the equation:

$$ARCH2(c) = \sum_{b \in adj(c)} \text{edge\_wt}(b,c) \times \frac{numV(b, !c)}{numV(b)} \quad \text{(Eq. 17)}$$

where numV(b, !c) is the number of VMLAs which cover cell b but not c. The SMSCH payload and ARCH load other than that due to VMLA registrations stays the same in overlapping cases as compared to non-overlapping case. Therefore, the total SPACH load on cell c is defined by the equation:

$$SPACH(c) = \sum_{V \supset c} \sum_{a \in V} \frac{node\_wt(a)}{numV(a)} + edge\_wt(c, c) + \qquad \text{(Eq. 18)}$$

$$\sum_{b \in adj(c)} edge\_wt(b, c) \times \frac{numV(b, !c)}{numV(b)}$$

Finally, the load on a VMLA is the SPACH load on the heaviest load cell and is defined by the equation:

$$Load\,(VMLA) = \max_{c \in VMLA} SPACH(c) \qquad \text{(Eq. 19)}$$

According to step 306 of FIG. 3, the method 300 according to the present invention minimizes the total number of VMLA registrations while ensuring that the load on every VMLA Load(VMLA) in the service area 100 is less than the Limit, the total number of actual SPACH time slots available in a hour. Given a number N and an initial boundary settings of N VMLAs, a KL graph partition algorithm can find the optimal boundary setting of these N VMLAs by adjusting boundaries of the VMLAs until the optimal boundary setting is determined. In an optimal boundary setting for N VMLAs, the total number of VMLA registrations is minimized while the VMLAs are evenly loaded.

The optimal VMLA boundary setting is determined by iteratively applying a modified KL system partition algorithm. KL system partitions are generally known and will not be described herein except as to expand upon the principles of the present invention. For a description of KL system partitions, see B. W. Kernighan and S. Lin, "An Efficient Heuristic Procedure for Partitioning Graphs", *The Bell System Technical Journal*, pp. 291–307, (Feb., 1970). Once the optimal VMLA boundary settings are determined according to the method 300, they are implemented as determined according to step 308.

Figure 5:
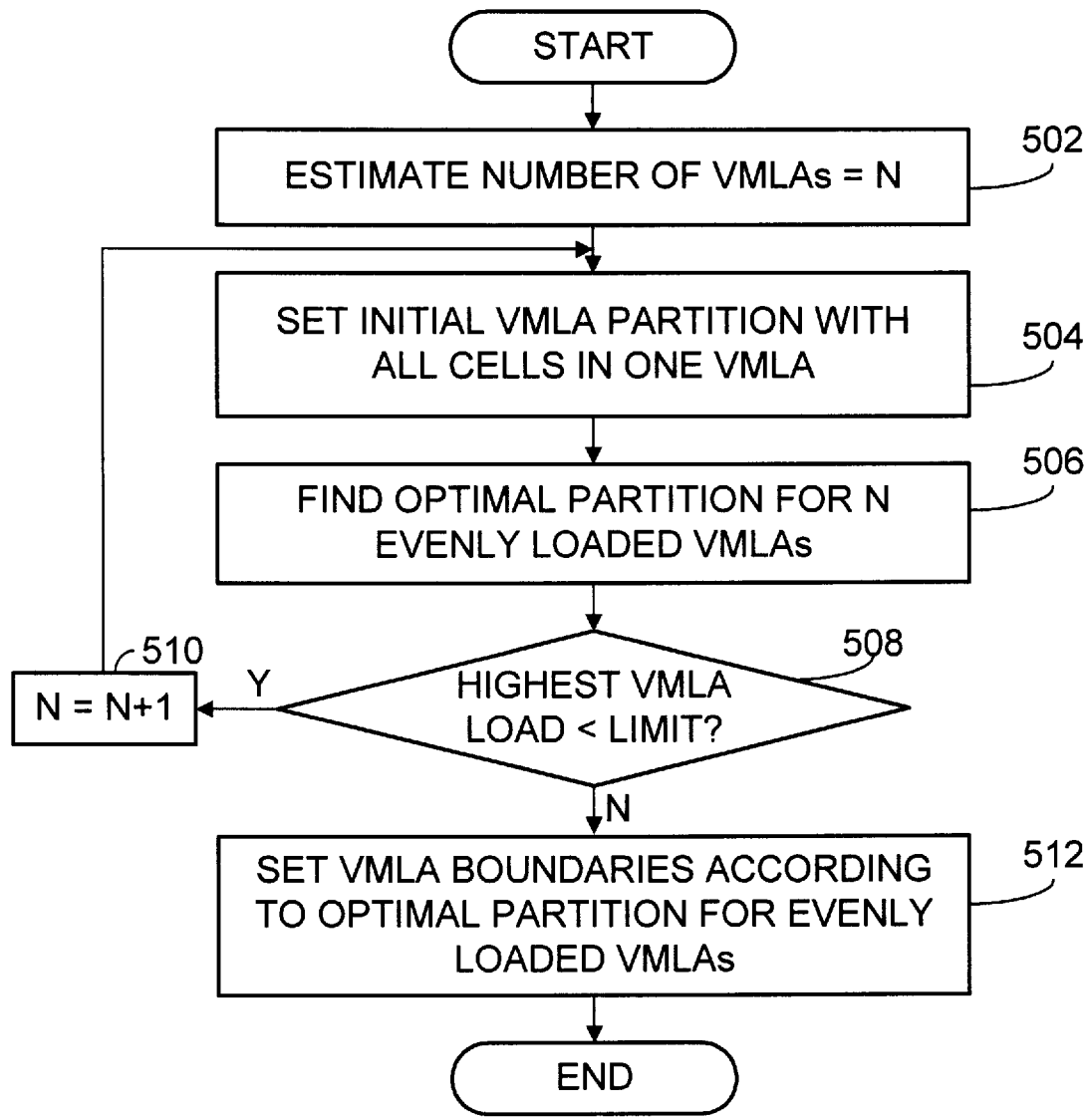
FIG. 5 is a logic diagram illustrating in more detail operation of a method for forming location areas within a cellular wireless communication system according to the present invention in which a number of location areas is first selected and then optimal boundaries are determined.

FIG. 5 illustrates in more detail the partitioning of a multi-cell service area into VMLAs according to the present invention. At step 502, the number of VMLAs that should be required is estimated as N according to equation 9 or a similar calculation. Then, operation proceeds to step 504 wherein an initial partition is determined with one VMLA containing all cells of the service area 100 and the other N−1 VMLAs containing none of the cells. Then, operation proceeds to step 506 where an optimal partition of N evenly loaded VMLAs is determined. If the highest VMLA load among the N VMLAs is less than Limit at step 508, operation proceeds to step 512 wherein the VMLA boundaries within the service area 100 are set according to the optimal partition for evenly loaded VMLAs determined at step 508.

Otherwise, if at step 508 it is determined that the highest VMLA load is not less than Limit, operation proceeds to step 510 where the number of VMLAs is increased by one to N+1 and operation proceeds to step 504. The modified KL graph partition algorithm is run again at steps 504 and 506 to determine an optimal partition with N+1 VMLAs. The highest VMLA load for the N+1 VMLAs is then checked to determine if it is less than Limit at step 508. The final partition, once the correct number of VMLAs have been allocated, will be the optimal VMLA setting because it has the minimum number of VMLA registrations and the loads on all VMLAs are within their capacity limit.

Figure 6:
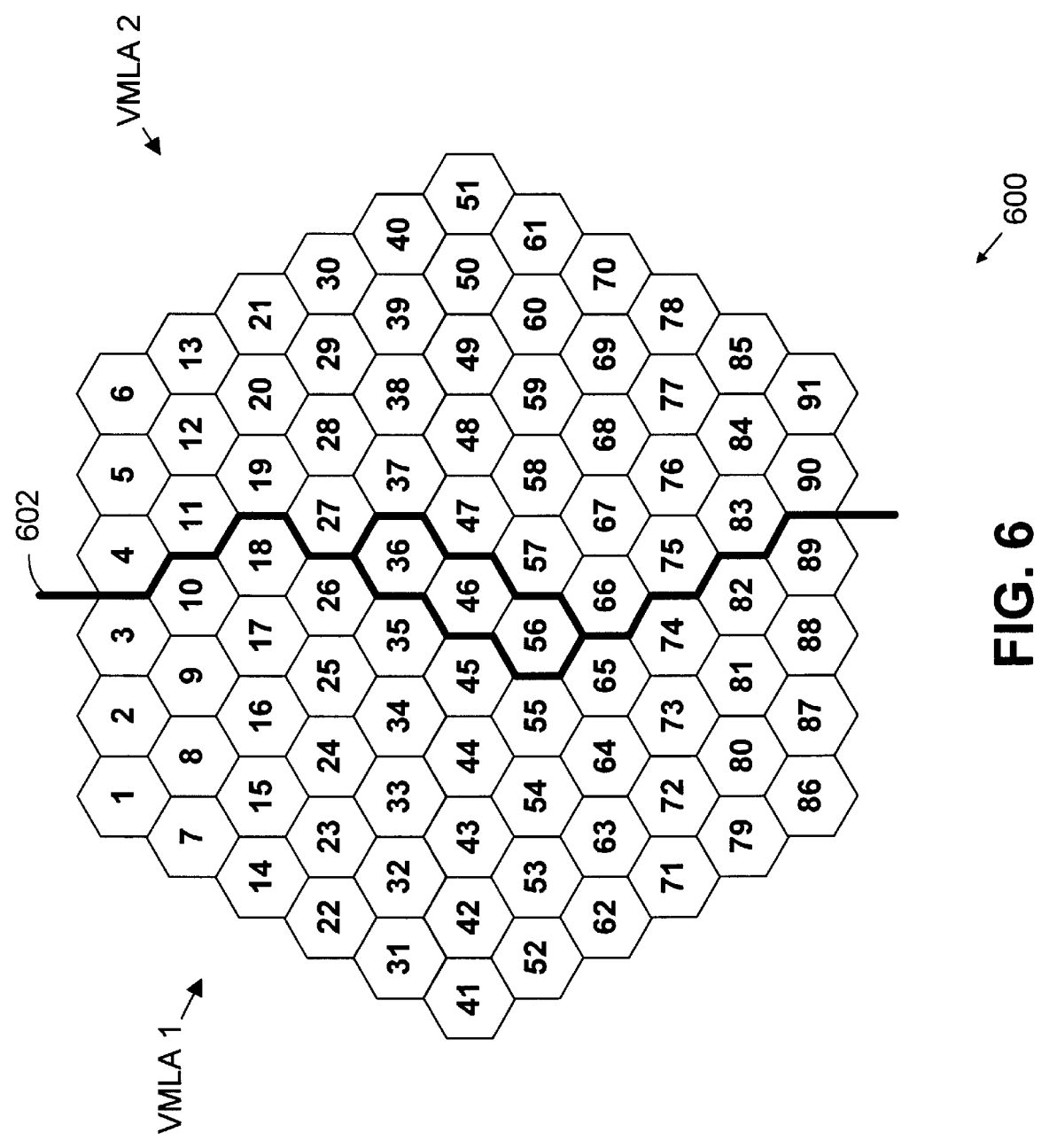

FIG. 6 illustrates the partitioning of a service area 600 into two VMLAs, VMLA 1 and VMLA 2, according to the principles of the present invention. As is shown, boundary 602 defines the boundary between VMLA 1 and VMLA 2. The boundary 602 is set, however, to have cells 36, 46 and 56 reside within both VMLAs. The partition set by boundary 602 is optimal and requires the minimum number of VMLA registrations with the VMLA load in both VMLA 1 and VMLA 2 below their capacity limits.

Figure 7A:
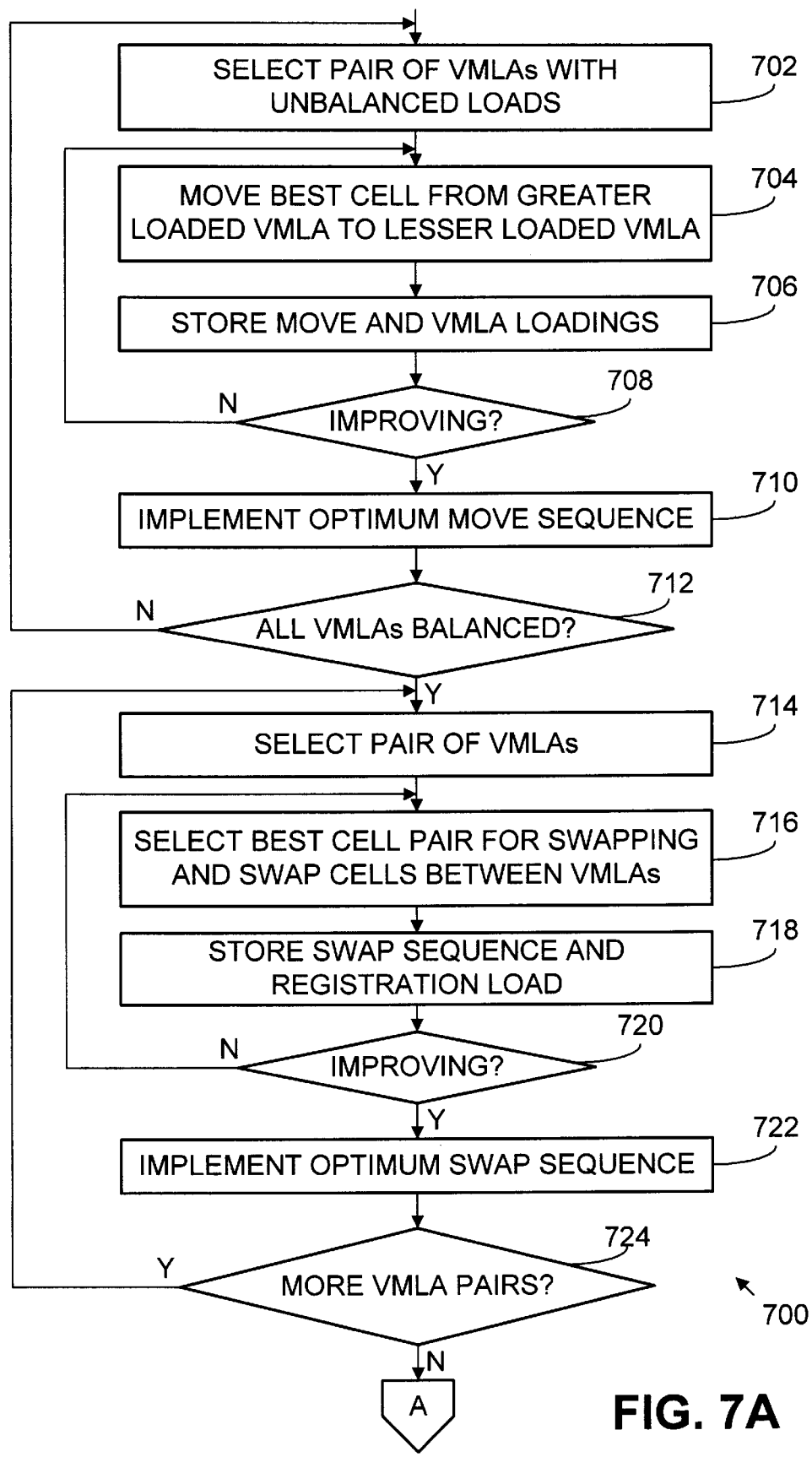
FIGS. 7A and 7B are logic diagrams illustrating in detail operation of the method of the present invention in optimizing boundaries of location areas.
Figure 7B:
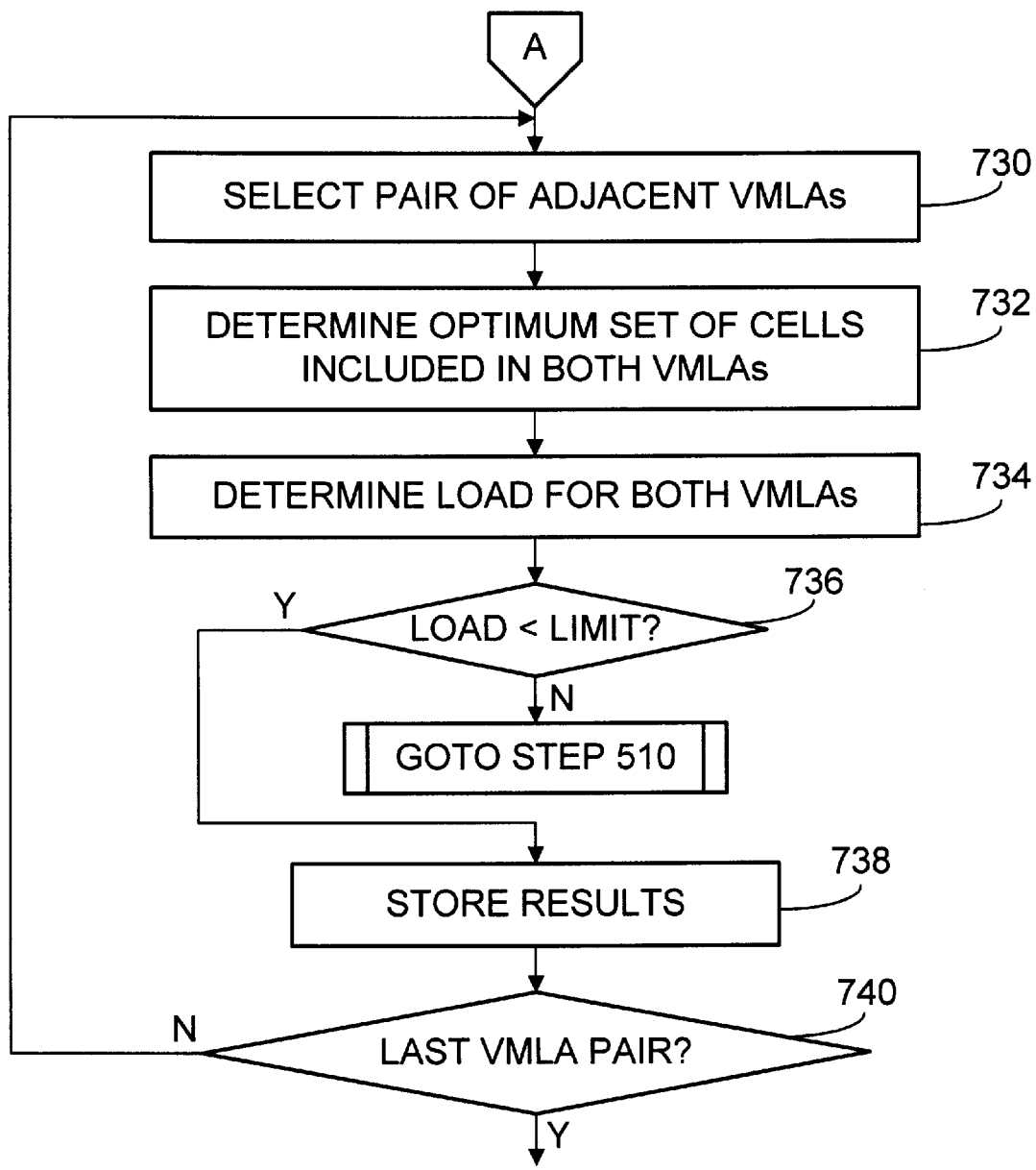

FIGS. 7A and 7B illustrate in detail operations taken within step 506 of FIG. 6. As was discussed, step 504 sets an initial partition with N VMLAs and with all cells residing one of the VMLAs. Operation then proceeds to step 702 wherein a pair of VMLAs of the N VMLAs is selected having unbalanced loads. At step 704, the "best" cell is moved from the greater loaded VMLA to the lesser loaded VMLA. The "best" cell is determined from the graph previously generated, with particular investigation to the reduction in paging load that would be created by moving any border cell from one of the two VMLAs under consideration to the other VMLA.

For example, referred to FIG. 6, all border cells along boundary 602 in the greater loaded VMLA, e.g. VMLA 1, would be considered for moving to VMLA 2. The "best" cell, e.g. cell 74, would then be determined to have the greatest positive impact if moved from VMLA 1 to VMLA 2. The "best" cell is then moved, the VMLA loadings recomputed and the move and loadings stored at step 706.

If the VMLA loading is still improving after the move, as determined at step 708, operation returns to step 706. VMLA loading is still improving after the move if the VMLA loading between the two VMLAs under consideration moves closer to being equal. However, if at step 708 it is determined that the VMLA loading did not improve after the move, operation proceeds to step 710 where the optimum move sequence is implemented. Then, it is determined at step 712 whether all VMLAs are balanced. If not, operation proceeds to step 702 where another set of unbalanced VMLAs are selected. If so, operation proceeds to step 714.

Steps 714 through 724 perform cell swapping between VMLAs in an attempt to reduce VMLA registrations. After the balancing process of steps 702 through 712, a VMLA partition is obtained in which the loading among VMLAs is substantially balanced and the number of VMLA registrations is lesser because cells with the biggest gain are always moved. However, the VMLA borders may not be set at the places where the number of VMLA registrations is the least because the goal of steps 702 through 712 is on balancing the load. Thus, it is necessary to swap some of pairs of cells which are in different VMLAs to reduce the number of registrations.

At step 714, a pair of VMLAs is selected for cell swapping purposes. Then, at step 716, the "best pair" of cells is determined for swapping and the cells are swapped between the VMLAs selected. The "best pair" is based upon the graph previously determined and the most positive impact that would be had by swapping the cells between the VMLAs. In order to find the "best pair," all possible cell pairs (e.g., one from VMLA 1 and one from VMLA 2) are considered to find the pair, if swapped, would produce the biggest gain (i.e., reduce the number of VMLA registrations the most).

Once determined, the "best pair" is swapped at step 718, the new registration loading is determined and the swap and results are stored. From step 718, operation proceeds to step 720 where it is determined whether the VMLA loading is still improving. If it is, operation returns to step 714. However, if it is not, it means the total number of registrations is at its lowest point for the VMLAs selected, and at the same time the loads on the VMLAs are balanced. Thus, if it is not, operation proceeds to step 722 where the optimum swap sequence is implemented. From step 722, operation proceeds to step 724 where it is determined if any more VMLA pairs exist upon which cell swapping may be performed. If more VMLA pairs exist upon which cell swapping may be performed at step 724, operation proceeds to step 716. If not, the total number of registrations for the VMLAs are minimized, the VMLA load is balanced and operation proceeds via off page connector A to step 730 of FIG. 7B.

FIG. 7B illustrates steps taken in determining which border cells of adjacent VMLAs are to be included in both VMLAs. As is known, traffic may move frequently back and forth between border cells of adjacent VMLAs. When a mobile unit leaves moves from one VMLA to an adjacent VMLA, it must register with the adjacent VMLA. With traffic frequency moving back and forth between border cells of adjacent VMLAs, the "ping-pong effect" may significantly increase registration loading in the adjacent VMLAs. Thus, to avoid the "ping-pong effect," border cells may be included in both of the adjacent VMLAs, such as cells 36, 46 and 56 illustrated in FIG. 6. Steps 730 through 740 of FIG. 7B illustrates steps taken according to the method of the present invention to place some border cells in both of the adjacent VMLAs.

At step 730, a pair of adjacent VMLAs is selected for consideration. Then, at step 732, a determination is made as to which, if any, adjacent cells are to be in both of the selected VMLAs. At step 732, all possibly beneficial combinations are considered with the optimal combination selected. Once the optimal combination is determined at step 732, the load for both VMLAs is determined at step 736. If the VMLA loading is less than the Limit as determined at step 736, operation proceeds to step 738 where the results are stored. However, if the load is not less than the Limit, operation proceeds to step 510 of FIG. 5 wherein an additional VMLA is added and operation proceeds accordingly thereinafter. At step 740, if all VMLA pairs has been considered, operation proceeds to step 508 of FIG. 5. However, if the last VMLA pair has not been considered, operation proceeds to step 730.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A method for distributing paging load in a multicell wireless communication system comprising the steps of:

determining a load limit for cells of the multicell wireless communication system;

determining a paging load for the cellular wireless communication system;

establishing a plurality of location areas within the multicell wireless communication system so that the paging load is distributed among the plurality of location areas and so that a partial paging load respective to each cell of the multicell wireless communication system is less than a respective load limit; and determining boundaries of the location areas to substantially minimize registration load within the multicell wireless communication system, comprising:

representing the multicell wireless communication system as a graph with each cell represented as a node in the graph;

assigning a weight to each node in the graph based upon respective paging load;

assigning a weight to each edge from a node to itself in the graph based upon non-paging load;

assigning a weight to each edge between bordering nodes in the graph based upon registration load between the bordering nodes; and performing a graph partition on the graph to create the plurality of location areas based upon the weights.

2. The method of claim 1, wherein the paging load for the cellular wireless communication system is determined based upon historical operations of the cellular wireless communication system.

3. The method of claim 1, wherein the load limit for a particular cell is determined based upon control channel resources that may be allocated to paging.

4. The method of claim 1, wherein the weight assigned to each node in the graph is determined using the equation:

$$\mathrm{node\_wt}(c) = [\mathrm{Mobile\_Termination}(c)/\alpha + \mathrm{MWI}(c) + \mathrm{SMS\_Paging}(c)] \times (1 + \mathrm{rpgr})$$

where

Mobile_Termination(c) is the number of mobile terminations in cell c;

MWI(c) is the MWI load for cell c;

SMS_Paging(c) is the SMS paging load for cell c;

rpgr is the repage rate; and $\alpha$ is a parameter that addresses efficiency in paging slot usage.

5. The method of claim 1, wherein the weight to each edge from a node to itself is determined using the equation:

$$\mathrm{edge\_wt}(c,c) = \mathrm{SMSCH}(c) + \mathrm{ARCH1}(c)$$

where

SMSCH(c) is the load consumed due to SMSCH payload on cell c; and

ARCH1(c) is the registration loading on cell c not due to location area registrations.

6. The method of claim 1, wherein the weight to each edge between bordering nodes is determined using the equation:

$$\mathrm{edge\_wt}(b,c) = \mathrm{regHofRatio} \times \mathrm{handoff}(b,c) \times \mathrm{regAcptSlots}$$

where handoff(b,c) is the number of handoffs from cell c to b;

regHofRatio is a ratio between the number of registrations and handoffs; and regAcptSlots is the number of registration and acceptance slots used in registration.

7. The method of claim 1, wherein the location areas are created so that some of the cells of the multicell wireless communication system reside in a plurality of location areas.

8. The method of claim 1, wherein determining boundaries of the location areas includes moving cells between location areas in an attempt to reduce registration load.

9. The method of claim 1, wherein determining boundaries of the location areas includes swapping cells between location areas in an attempt to reduce registration load.

10. The method of claim 1, wherein determining boundaries of the location areas includes placing cells in multiple location areas in an attempt to reduce registration load.

11. A method for distributing paging load in a multicell wireless communication system comprising the steps of:

determining a load limit for cells of the multicell wireless communication system;

determining a paging load for the cellular wireless communication system;

estimating the number of location areas required within the multicell wireless communication system so that the paging load is distributed among the plurality of location areas and so that a partial paging load respective to each cell of the multicell wireless communication system is less than a respective load limit;

determining boundaries of the location areas to substantially minimize registration load within the multicell wireless communication system comprising:

representing the multicell wireless communication system as a graph with each cell represented as a node in the graph and;

assigning a weight to each node in the graph based upon respective paging load;

assigning a weight to each edge from a node to itself in the graph based upon non-paging load;

assigning a weight to each edge between bordering nodes in the graph based upon registration load between the bordering nodes; and performing a graph partition on the graph to create the plurality of location areas based upon the weights;

determining the maximum paging load within the multicell wireless communication system; and if the maximum paging load exceeds the load limit, re-estimating the number of location areas required and re-determining boundaries of the location areas.

12. The method of claim 11, wherein the paging load for the cellular wireless communication system is determined based upon historical operations of the cellular wireless communication system.

13. The method of claim 11, wherein the load limit for a particular cell is determined based upon control channel resources that may be allocated to paging.

14. The method of claim 11, wherein the weight assigned to each node in the graph is determined using the equation:

$$node\_wt(c) = [Mobile\_Termination(c)/\alpha + MWI(c) + SMS\_Paging(c)] \times (1 + rpgr)$$

where

Mobile_Termination(c) is the number of mobile terminations in cell c;

MWI(c) is the MWI load for cell c;

SMS_Paging(c) is the SMS paging load for cell c;

rpgr is the repage rate; and $\alpha$ is a parameter that addresses efficiency in paging slot usage.

15. The method of claim 11, wherein the weight to each edge from a node to itself is determined using the equation:

$$edge\_wt(c,c) = SMSCH(c) + ARCH1(c)$$

where

SMSCH(c) is the load consumed due to SMSCH payload on cell c; and

ARCH1(c) is the registration loading on cell c not due to location area registrations.

16. The method of claim 11, wherein the weight to each edge between bordering nodes is determined using the equation:

$$edge\_wt(b,c) = regHofRatio \times handoff(b,c) \times regAcptSlots$$

where handoff(b,c) is the number of handoffs from cell c to b;

regHofRatio is a ratio between the number of registrations and handoffs; and regAcptSlots is the number of registration and acceptance slots used in registration.

17. The method of claim 11, wherein the location areas are created so that some of the cells of the multicell wireless communication system reside in a plurality of location areas.

18. The method of claim 11, wherein determining boundaries of the location areas includes moving cells between location areas in an attempt to reduce registration load.

19. The method of claim 11, wherein determining boundaries of the location areas includes swapping cells between location areas in an attempt to reduce registration load.

20. The method of claim 11, wherein determining boundaries of the location areas includes placing cells in multiple location areas in an attempt to reduce registration load.

21. A multicell wireless communication system configured to have reduced paging load, the wireless communication system comprising:

a wireless communication system infrastructure that provides wireless service within a plurality of cells, the plurality of cells together forming a service area that includes a paging load;

each of the plurality of cells having a load limit;

a plurality of location areas formed such that each of the plurality of location areas includes at least one cell of the plurality of cells and supports a portion of the paging load so that each portion of the paging is less than the load limit; and at least one location area boundary that separates location areas, the at least one location area boundary selected to substantially minimize registration load within the multicell wireless communication system, wherein the location area boundaries are selected by:

representing the multicell wireless communication system as a graph with each cell represented as a node in the graph and;

assigning a weight to each node in the graph based upon respective paging load;

assigning a weight to each edge from a node to itself in the graph based upon non-paging load;

assigning a weight to each edge between bordering nodes in the graph based upon registration load between the bordering nodes; and performing a graph partition on the graph to create the plurality of location areas based upon the weights.

22. The multicell wireless communication system of claim 21, wherein the paging load for the cellular wireless communication system is determined based upon historical operations of the cellular wireless communication system.

23. The multicell wireless communication system of claim 21, wherein the load limit for a particular cell is determined based upon control channel resources that may be allocated to paging.

24. The multicell wireless communication system of claim 21, wherein the location areas are created so that some of the cells of the multicell wireless communication system reside in a plurality of location areas.

* * * * *